(12) United States Patent
Yang et al.

(10) Patent No.: US 10,601,129 B2
(45) Date of Patent: Mar. 24, 2020

(54) MIMO ANTENNA DEVICE AND MOBILE COMMUNICATION DEVICE

(71) Applicants: Molex Interconnect (Shanghai) Co., Ltd., Pudong (CN); Shanghai University, Shanghai (CN)

(72) Inventors: Guang Li Yang, Shanghai (CN); Yi Xin Li, Shanghai (CN); Yu Mei Yu, Shanghai (CN); Xiao Jun Tang, Shanghai (CN); Hua Feng Shen, Shanghai (CN)

(73) Assignee: Molex, LLC, Lisle, IL (US)

( * ) Notice: Subject to any disclaimer, the term of this patent is extended or adjusted under 35 U.S.C. 154(b) by 197 days.

(21) Appl. No.: 15/860,723

(22) Filed: Jan. 3, 2018

(65) Prior Publication Data

US 2018/0212321 A1 Jul. 26, 2018

(30) Foreign Application Priority Data

Jan. 20, 2017 (CN) .......................... 2017 1 0048013

(51) Int. Cl.
*H01Q 1/38* (2006.01)
*H01Q 1/52* (2006.01)
(Continued)

(52) U.S. Cl.
CPC .............. *H01Q 1/52* (2013.01); *H01Q 1/241* (2013.01); *H01Q 1/243* (2013.01); *H01Q 1/521* (2013.01);
(Continued)

(58) Field of Classification Search
CPC ........ H01Q 1/52; H01Q 1/241; H01Q 13/103; H01Q 21/0006
See application file for complete search history.

(56) References Cited

U.S. PATENT DOCUMENTS

2011/0181482 A1    7/2011    Adams et al.

FOREIGN PATENT DOCUMENTS

| CN | 104064866 A | 9/2014 |
| CN | 205016663 U | 2/2016 |

(Continued)

OTHER PUBLICATIONS

Office Action received for Japanese application No. 2018-005334, dated Jan. 22, 2019, 7 pages. (4 pages of English Translation and 3 pages of Official copy).

(Continued)

*Primary Examiner* — Graham P Smith
(74) *Attorney, Agent, or Firm* — Molex, LLC (57) ABSTRACT

The present disclosure provides a MIMO antenna device and a mobile communication device which comprises a metal shell and a metal piece, the metal shell comprises a metal back plate and a metal frame which are integrally formed, the metal frame surrounds the metal back plate, the metal piece and the metal shell enclose to form a metal cavity, the metal cavity comprises a battery region used to place a battery assembly and a non-battery region outside the battery region; a metal isolate wall is provided between the metal shell and the metal piece, the metal isolate wall partitions the metal cavity into a first cavity and a second cavity, the first cavity contains the battery region; a first feed unit feeds toward the first cavity to form a first antenna; and a second feed unit feeds toward the second cavity to form a second antenna. The MIMO antenna device and the mobile communication device in the present disclosure form a MIMO antenna device with high isolation through the first antenna and the second antenna, so as to achieve communication in the case of a full-metal outer shell.

21 Claims, 10 Drawing Sheets

(51) Int. Cl.
  *H01Q 21/00*   (2006.01)
  *H01Q 1/24*    (2006.01)
  *H01Q 13/10*   (2006.01)
  *H01Q 21/28*   (2006.01)
  *H01Q 13/18*   (2006.01)
  *H04B 1/38*    (2015.01)
  *H04B 7/0413*  (2017.01)

(52) U.S. Cl.
  CPC ........... *H01Q 13/103* (2013.01); *H01Q 13/18* (2013.01); *H01Q 21/0006* (2013.01); *H01Q 21/28* (2013.01); *H04B 1/38* (2013.01); *H04B 7/0413* (2013.01)

(56) References Cited

FOREIGN PATENT DOCUMENTS

| | | |
|---|---|---|
| CN | 105591190 A | 5/2016 |
| CN | 105720355 A | 6/2016 |
| JP | 2003-234615 A | 8/2003 |
| JP | 2013-017108 A | 1/2013 |
| JP | 2013-231452 A | 11/2013 |
| KR | 2010-0122803 A | 11/2010 |
| KR | 2015-0011041 A | 1/2015 |
| KR | 2016-0061770 A | 6/2016 |
| WO | 2007/058230 A1 | 5/2007 |

OTHER PUBLICATIONS

Notice of Allowance received for Korean patent application No. 10-2018-0006884, dated Apr. 18, 2019, 2 pages. (1 page of English translation and 1 page of Official copy).

MIMO ANTENNA DEVICE AND MOBILE COMMUNICATION DEVICE

RELATED APPLICATIONS

This application claims priority to Chinese Application No. 201710048013.X, filed Jan. 20, 2017, which is incorporated herein by reference in its entirety.

TECHNICAL FIELD

The present disclosure relates to the field of antennas, and particularly relates to a MIMO antenna device and a mobile communication device.

BACKGROUND ART

Currently, full-metal outer shells are being used more and more in wireless communication devices due to advantages thereof, such as beautiful appearance, high structural strength, excellent thermal conductivity and the like. Wireless communication device generally transfers an electromagnetic signal through an antenna device, however, the antenna device is easily shielded and interfered with by the metal outer shell when the signal is received and transmitted.

In order to overcome the signal shielding and interference, the outer shell of the wireless communication device in the prior art is generally composed of two parts, that is metal parts and a nonmetal spacer. An antenna radiation unit is designed to the nonmetal spacer of the outer shell, so that radiation of the antenna is not shielded by the metal parts or effect of the metal parts on radiation of the antenna is reduced to the greatest extent. However, such a prior art cannot achieve the full-metal outer shell, instead, non-metal spacer is added to reduce the shielding of radiation of the antenna, thereby affecting not only aesthetics and structural strength, but also complicating manufacturing process and increasing cost.

Meanwhile, a MIMO technology (Multiple Input Multiple Output, MIMO, refers to the use of multiple transmitting antennas at a transmitting end and multiple receiving antennas at a receiving end) is increasingly becoming a key technology of the wireless communication device. In order to achieve MIMO operation, two or more receiving antennas and transmitting antennas operating at the same frequency are needed. However, since multiple antennas operate simultaneously, signal interference easily occurs between the antennas, thereby affecting efficiency of receiving and transmitting signal.

Using MIMO technology with the full-metal outer shell, how to ensure that the signal is not affected by the metal outer shell and different antennas can operate simultaneously without causing signal interference between different antennas has become an important project troubling industry.

SUMMARY

An object of the present disclosure is to provide a MIMO antenna device and a mobile communication device in which the signal can be effectively transmitted and received when the outer shell is full-metal and the MIMO technology is used in an antenna device.

According to a first aspect of the present disclosure, a MIMO antenna device is provided and comprises: a metal shell, the metal shell comprises a metal back plate and a metal frame which are integrally formed, the metal frame surrounds the metal back plate; a metal piece, the metal piece and the metal shell enclose to form a metal cavity, the metal cavity comprises a battery region used to place a battery assembly and a non-battery region outside the battery region; a metal isolate wall, the metal isolate wall is provided between the metal shell and the metal piece, the metal isolate wall partitions the metal cavity into a first cavity and a second cavity, the first cavity contains the battery region; a first feed unit, the first feed unit feeds toward the first cavity to form a first antenna; and a second feed unit, the second feed unit feeds toward the second cavity to form a second antenna.

In an embodiment, a gap which is communicated is formed between a periphery of the metal piece and the metal frame.

In an embodiment, the metal isolate wall is provided in the non-battery region.

In an embodiment, the metal isolate wall is provided at a boundary between the battery region and the non-battery region.

In an embodiment, the metal cavity is a rectangular shape, an extending direction of the metal isolate wall is parallel to a length direction or a width direction of the metal cavity.

In an embodiment, the metal isolate wall extends to connect two opposite side surfaces of the metal frame.

In an embodiment, the metal isolate wall and the metal shell are integrally formed.

In an embodiment, the metal isolate wall and the metal piece are integrally formed.

In an embodiment, the first antenna or the second antenna further comprises a radiation unit and a first printed circuit board, the radiation unit comprises a first slot and a second slot which are provided on the first printed circuit board and connected, a sum of lengths of the first slot and the second slot is equal to one fourth of a wavelength of an operating band of the first antenna or the second antenna.

In an embodiment, the first slot and the second slot form a L-shape.

In an embodiment, the first antenna further comprises a second printed circuit board and a spurious unit, the spurious unit comprises a first ribbon wire and a second ribbon wire which are connected to form a L-shape; the first feed unit is electrically connected with the second printed circuit board, the first feed unit comprises a third ribbon wire, a fourth ribbon wire and a fifth ribbon wire which are connected, the third ribbon wire, the fourth ribbon wire and the fifth ribbon wire form a U-shape, the first ribbon wire is provided parallel to and between the third ribbon wire and the fifth ribbon wire; the first cavity is coupling-fed by the first feed unit, the spurious unit is coupling-fed by the first feed unit.

In an embodiment, the second antenna further comprises a second printed circuit board and a spurious unit, the spurious unit comprises a first ribbon wire and a second ribbon wire which are connected to form a L-shape; the second feed unit is electrically connected with the second printed circuit board, the second feed unit comprises a third ribbon wire, a fourth ribbon wire and a fifth ribbon wire which are connected, the third ribbon wire, the fourth ribbon wire and the fifth ribbon wire form a U-shape, the first ribbon wire is provided parallel to and between the third ribbon wire and the fifth ribbon wire; the second cavity is coupling-fed by the second feed unit, the spurious unit is coupling-fed by the second feed unit.

In an embodiment, the MIMO antenna device of the first aspect further comprises an adjustable capacitor, the adjustable capacitor electrically connects the metal shell and the metal piece.

In an embodiment, the MIMO antenna device of the first aspect further comprises an adjustable capacitor, the adjustable capacitor electrically connects the first printed circuit board and the metal shell, or electrically connects the first printed circuit board and the metal piece.

In an embodiment, the MIMO antenna device of the first aspect further comprises an adjustable capacitor, the adjustable capacitor electrically connects the second printed circuit board and the metal shell, or electrically connects the second printed circuit board and the metal piece.

According to a second aspect of the present disclosure, a mobile communication device is provided and comprises the MIMO antenna device of the first aspect as above.

In an embodiment, the mobile communication device of the second aspect further comprises a display device, the display device is provided to one side of the metal piece opposite to the metal back plate.

In an embodiment, the mobile communication device of the second aspect of further comprises: a signal transceiver, the signal transceiver is electrically connected with the circuit board, the signal transceiver is used to output power such that the feed units feed toward the antenna device and receives signals received by the antenna device.

Due to the above technology, the MIMO antenna device and the mobile communication device of the present disclosure receive and transmit signals through the first antenna comprising the first cavity and the second antenna comprising the second cavity respectively, therefore the first antenna and the second antenna form the MIMO antenna device to effectively carry out receiving and transmitting signals in the case of full-metal outer shell.

The first antenna and the second antenna are independent from each other, so as to ensure good isolation between the first antenna and the second antenna without signal interference to together achieve a MIMO function.

The metal cavity is divided into the battery region and the non-battery region, the battery region is provided in the first antenna, so that the effect generated by the battery assembly on the antennas is controlled in the first antenna, so that receiving and transmitting signal of the second antenna is not affected by the battery assembly, and meanwhile, such an arrangement is convenient in the structure design of the first antenna and the frequency adjustment of receiving and transmitting signal.

BRIEF DESCRIPTION OF THE DRAWINGS

Technical solutions of the present disclosure are described in detail below with reference to the accompanying drawings and specific embodiments to make features and advantages of the present disclosure more apparent.

DETAILED DESCRIPTION OF THE PREFERRED EMBODIMENTS

Embodiments of the present disclosure will be described below in detail. Although the present disclosure will be described and illustrated in combination with some specific embodiments, it should be noted that the present disclosure is not limited to these specific embodiments. Instead, all modifications or equivalent replacements to the present disclosure should be included in the scope of the claims of the present disclosure.

In addition, in order to better explain the present disclosure, numerous specific details are given in the following specific embodiments. Those skilled in the art will understand that the present disclosure may be still implemented without these specific details. In other examples, well-known structures and components have not been described in detail so as to highlight the gist of the present disclosure.

It should be understood that, although the terms "first", "second" and the like may be used herein to describe various units or devices, the units or devices should not be limited by these terms. These terms are only used to distinguish one device from another device. For example, without departing from the scope of exemplary embodiments, a first antenna may be referred to as a second antenna, and similarly a second cavity may be referred to as a first cavity.

Figure 1A:
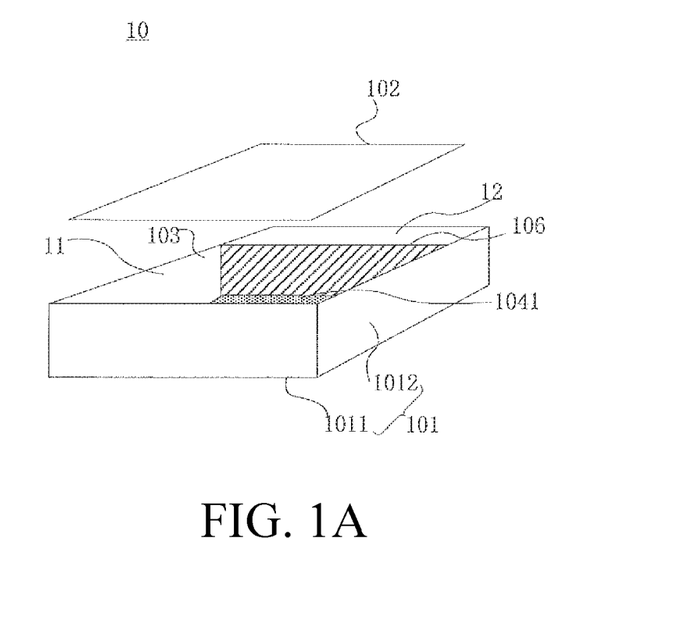
FIG. 1A is a perspective view of an antenna device in a first embodiment of the present disclosure.
Figure 1B:
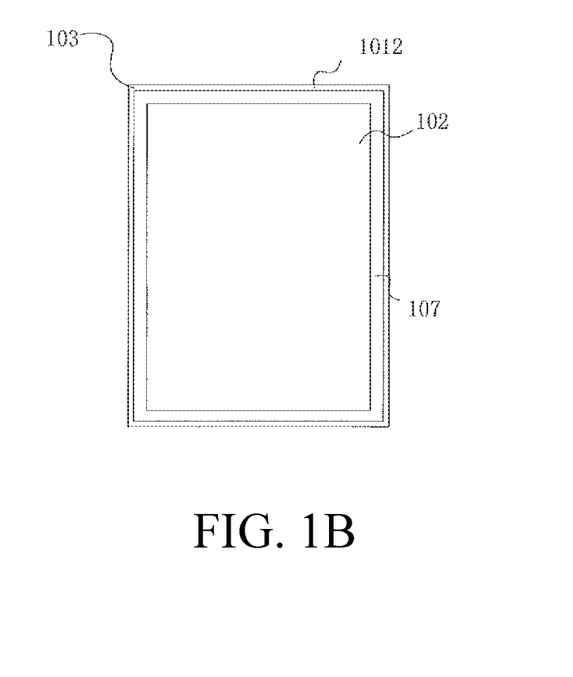
FIG. 1B is a top view of the antenna device in the first embodiment of the present disclosure.
Figure 2:
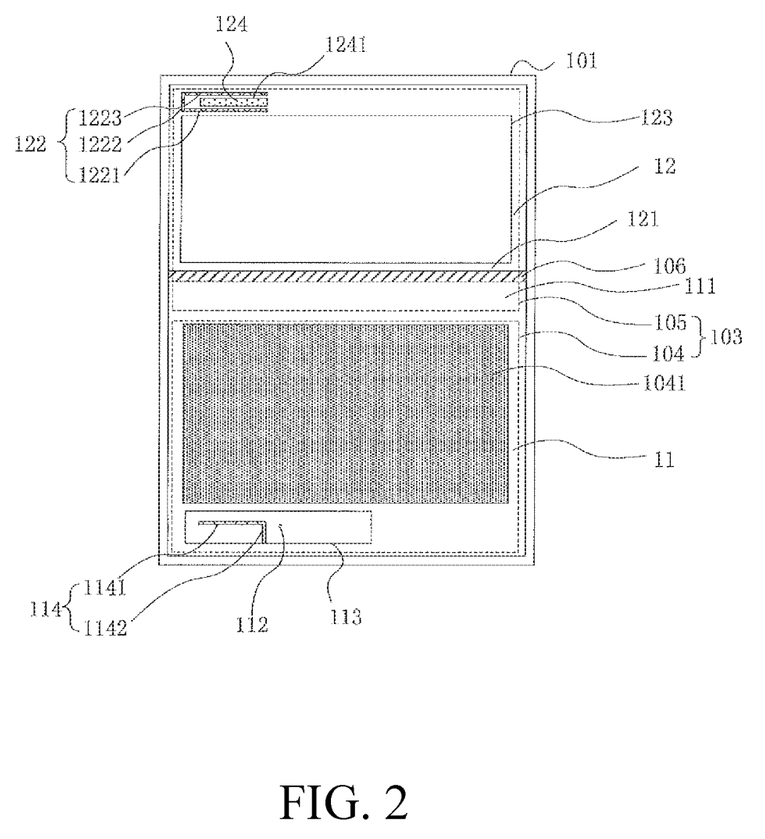
FIG. 2 is a top view of the antenna device in the first embodiment of the present disclosure with a metal piece removed.

Exemplary embodiments of the present disclosure will now be described in detail referring to the accompanying figures. FIG. 1A is a perspective view of an antenna device in a first embodiment of the present disclosure, FIG. 1B is a top view of the antenna device in the first embodiment of the present disclosure, FIG. 2 is a top view of the antenna device in the first embodiment of the present disclosure with a metal piece removed. As shown in FIG. 1A, FIG. 1B and FIG. 2, an antenna device 10 of a first embodiment of the present disclosure comprises a metal shell 101 and a metal piece 102. The metal shell 101 is a full-closed metal, the metal shell 101 comprises a metal back plate 1011 and a metal frame 1012 surrounding the metal back plate 1011, the metal back plate 1011 and the metal frame 1012 are integrally formed. In the embodiment, the antenna device 10 is a rectangular cuboid shape, and in other embodiments, the antenna device 10 may be other shapes.

The metal shell 101 and the metal piece 102 enclose to form an unclosed metal cavity 103, a gap 107 is formed between a periphery of the metal piece 102 and the metal frame 1012. The metal cavity 103 comprises a battery region 104 and a non-battery region 105 outside the battery region 104. The battery region 104 is used to place a battery assembly 1041. Since a volume of the battery assembly 1041 is larger than those of the other components, while a material of an outer surface of the battery assembly 1041 easily interferes with an electromagnetic signal, therefore, the battery region 104 in which the battery assembly 1041 is placed is separated from the non-battery region 105 to provide structural arrangement in the antenna device 10 of the present disclosure in targeted manner, so as to reduce signal interference, and improve the efficiency of receiving and transmitting signal of the antenna device 10.

Figure 3:
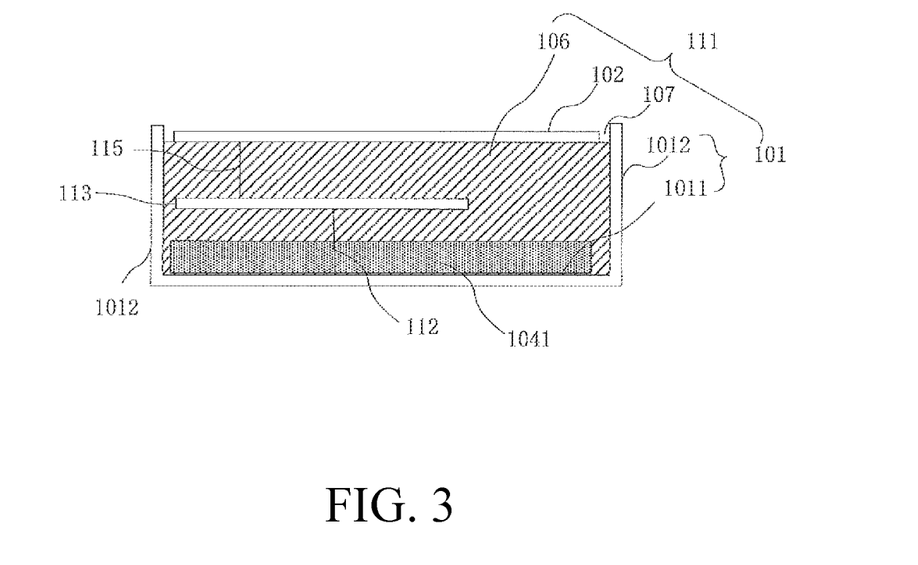
FIG. 3 is a cross-sectional view of the antenna device taken at a first antenna in the first embodiment of the present disclosure.
Figure 4:
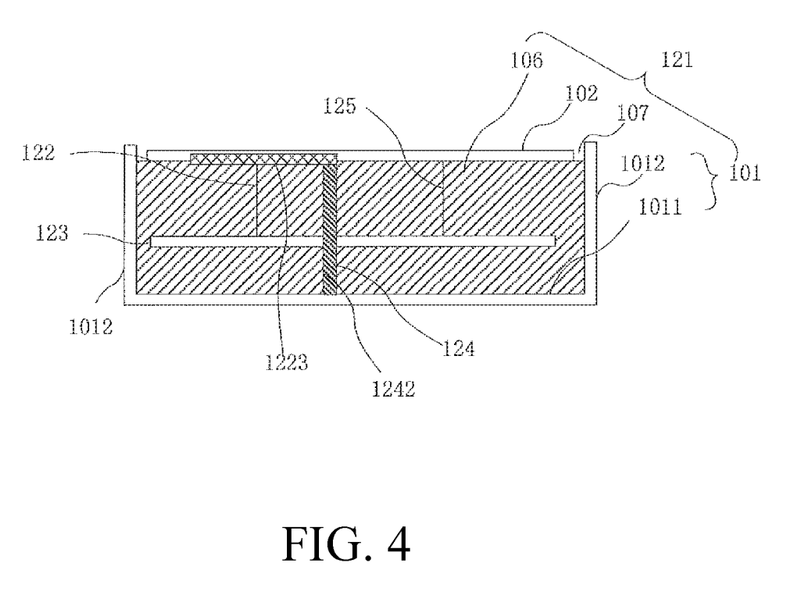
FIG. 4 is a cross-sectional view of the antenna device taken at a second antenna in the first embodiment of the present disclosure.

FIG. 3 is a cross-sectional view of the antenna device taken at a first antenna in the first embodiment of the present disclosure, FIG. 4 is a cross-sectional view of the antenna device taken at a second antenna in the first embodiment of the present disclosure.

As shown in FIG. 2, FIG. 3 and FIG. 4, the antenna device 10 of the present disclosure is a MIMO antenna device, and comprises a first antenna 11 and a second antenna 12. The first antenna 11 comprises a first cavity 111 and a first feed unit 112, the first feed unit 112 directly feeds or coupling-feeds toward the first cavity 111. The second antenna 12 comprises a second cavity 121 and a second feed unit 122, the second feed unit 122 directly feeds or coupling-feeds toward the second cavity 121.

The metal cavity 103 is provided with a metal isolate wall 106, the metal isolate wall 106 is provided between the metal shell 101 and the metal piece 10 to partition the metal cavity 103 into the first cavity 111 and the second cavity 121.

Since the first antenna 11 and the second antenna 12 of the present disclosure comprise the first cavity 111 and the second cavity 121 respectively, the first cavity 111 and the second cavity 121 are partitioned clearly and independent from each other. The first cavity 111 and the second cavity 121 are fed by the first feed unit 112 and the second feed unit 122 respectively, and are not electrically connected between each other, therefore the first cavity 111 and the second cavity 121 operate independently. Through such an arrangement, it is ensured that the first antenna 11 and the second antenna 12 have good isolation and do not interfere with each other, so that the antenna device 10 achieves a MIMO function.

The first antenna 11 serves as a cavity antenna, which resonant frequency is mainly determined by a length, a width and a height of the first cavity 111. Specifically, the first cavity 111 in a rectangular cuboid shape in the embodiment has a length, a width and a height, the resonant frequency of the first antenna 11 meets the following expression:

$$f_1 = \frac{1}{2}v\sqrt{\left(\frac{m}{a_1}\right)^2 + \left(\frac{n}{b_1}\right)^2 + \left(\frac{p}{c_1}\right)^2}$$

m, n, p=0, 1, 2, 3, 4 . . . (integer).

Where v is the speed of light in the air. The same first antenna 11 has multiple modes, different combinations of m, n, p represent different modes, different modes correspond to different resonant frequencies, that is, the first antenna 11 has multiple operating frequencies.

Similarly, the second antenna 12 serves as a cavity antenna, which resonant frequency is mainly determined by a length, a width and a height of the second cavity 121. The resonant frequency $f_2$ of the second antenna 12 meets the following expression:

$$f_2 = \frac{1}{2}v\sqrt{\left(\frac{m}{a_2}\right)^2 + \left(\frac{n}{b_2}\right)^2 + \left(\frac{p}{c_2}\right)^2}$$

m, n, p=0, 1, 2, 3, 4 . . . (integer).

Where v is the speed of light in the air. $a_2$, $b_2$ and $c_2$ respectively represent the length, the width and the height of the second cavity 121. Different combinations of m, n, p represent different modes.

Resonant frequencies of the first antenna 11 and the second antenna 12 are also affected by a length of the gap 107. As the length of the gap 107 formed between the periphery of the metal piece 102 and the metal frame 1012 increases, the resonant frequencies of the first antenna 11 and the second antenna 12 are reduced. In the embodiment, the gap 107 is preferably communicated in a ring shape to compensate for the resonant frequency of the first antenna 11 with the smaller length, width and height and the resonant frequency of the second antenna 12 with the smaller the length, width and height.

In other embodiments, the gap 107 is not communicated, and the first antenna 11 and the second antenna 12 operate at specific frequencies by designing the length, the width and the height of the first cavity 111 and the length, the width and the height of the second cavity 121 with designing the length of the gap 107.

The first cavity 111 of the first antenna 11 contains the battery region 104 to control the effect of the battery assembly 1041 on a signal to be within the first antenna 11, so that the second antenna 12 may be not affected by the battery assembly 1041, and it is also convenient to design and adjust the structure of the first antenna 11.

It should be noted that a range of the first cavity 111 does not necessarily coincide with a range of the battery region 104, as shown in FIG. 2, the metal isolate wall 106 is provided in the non-battery region 105, herein the first cavity 111 comprises the battery region 104 and a part of the non-battery region 105, the second cavity 121 comprises a remaining part of the non-battery region 105.

Preferably, the metal isolate wall 106 is provided at a boundary between the battery region 104 and the non-battery region 105, that is, the metal isolate wall 106 is provided in the non-battery region 105, and a side surface of the metal isolate wall 106 facing the battery assembly 1041 attaches the battery assembly 1041. Such an arrangement simplifies the structural design and adjustment of the first antenna 11, when the resonant frequency $f_1$ of the first antenna 11 is applicable to the expression, a length $a_3$, a width $b_3$ and a height $c_3$ of the battery assembly 1041 are correspondingly subtracted on a basis of the length, the width, and the height of the first cavity 111. The effect of the material of the outer surface of the battery assembly 1041 on the signal is also more convenient for simulation and adjustment.

In the embodiment, the battery region 104 and the non-battery region 105 are arranged in a length direction, an extending direction of the metal isolate wall 106 is parallel to a width direction of the metal cavity 103. The metal isolate wall 106 extends to connect two opposite side surfaces of the metal frame 1012 to form the first cavity 111 and the second cavity 121 which are complete and independent, thereby ensuring that the first antenna 11 and the second antenna 12 do not interfere with each other at the specific frequencies.

As an alternative embodiment, the metal isolate wall 106 serving as a separate component is inserted into the metal shell 101, a connection between the metal isolate wall 106 and the metal shell 101 and the metal piece 102 are ensured by providing a flexible conductive material, such as a conductive foam and the like, between the metal isolate wall 106 and the metal shell 101 and between the metal isolate wall 106 and the metal piece 102, the first cavity 111 and the second cavity 121 which are complete and independent are formed.

As another alternative embodiment, the metal isolate wall 106 and the metal shell 101 are integrally formed, so as to strengthen the connection between the metal isolate wall 106 and the metal shell 101 while reduce the assembling process, the use of the flexible conductive material and cost.

In other embodiments, the metal isolate wall 106 and the metal piece 102 are integrally formed, the metal isolate wall 106 is inserted into the metal shell 101 during assembling, forming processes is more convenient, and the assembling is simple.

Hereinafter the first antenna 11 is described.

As shown in FIG. 2 and FIG. 3, in the embodiment, the first feed unit 112 directly feeds toward the first cavity 111. Direct feed means that the first feed unit 112 feeds toward the first cavity 111 by directly contacting the first cavity 111.

A first printed circuit board 113 is provided inside the first antenna 11, one end of the first feed unit 112 is connected with the first printed circuit board 113 to obtain an excitation current from the first printed circuit board 113. The other end of the first feed unit 112 is directly connected with the metal shell 101 so as to directly excite the first cavity 111 to resonate at specific resonant frequencies. As another implementation manner implementing direct feed, in other embodiments, the other end of the first feed unit 112 may be directly connected with the metal piece 102. In direct feed, the first feed unit 112 may be a spring probe, a metal spring plate or an electrical wire. Preferably, the first feed unit 112 is provided at one side of the battery assembly 1041 far from the metal isolate wall 106 such that the first feed unit 112 has a better excitation effect on the first cavity 111.

The first antenna 11 further comprises a radiation unit 114. The radiation unit 114 comprises a first slot 1141 and a second slot 1142 which are provided on the first printed circuit board 113 and connected, a sum of lengths of the first slot 1141 and the second slot 1142 is equal to one fourth (¼) of a wavelength of an operating band of the first antenna 11. It should be noted that "equal to" herein means "approximately equal to", a certain error value may be included, there is no requirement for strictly being equal to a certain value, "equal" appearing later also has the same explanation.

The first slot 1141 and the second slot 1142 form a L-shape, in other embodiments, the first slot 1141 and the second slot 1142 also may form other shapes. The radiation unit 114 is directly fed by the first printed circuit board 113, operating bands of the radiation unit 114 partially overlap the frequencies corresponding to the modes formed by the first cavity 111 to supplement the first cavity 111. When the frequency of the radiation unit 114 is required to adjust, only a total length of the first slot 1141 and the second slot 1142 is required to adjust.

Figure 5:
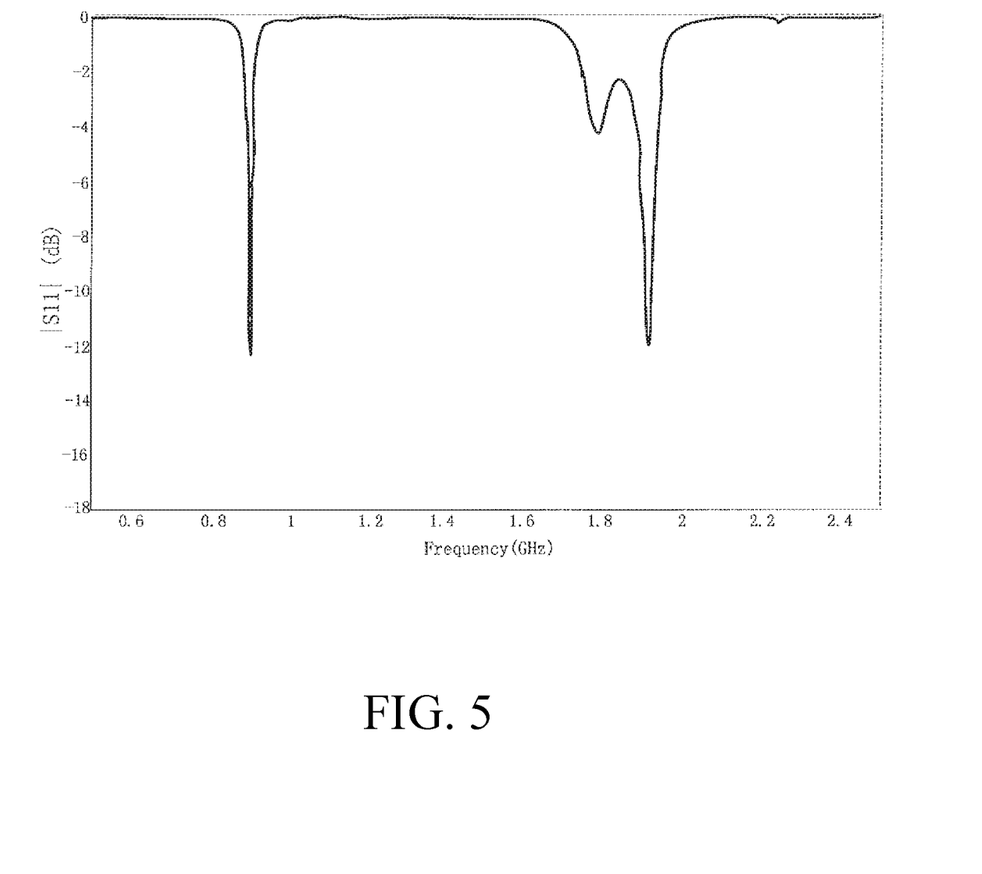
FIG. 5 is a frequency-return loss diagram of the first antenna in the first embodiment of the present disclosure.

FIG. 5 is a frequency-return loss diagram of the first antenna in the first embodiment of the present disclosure. As shown in FIG. 5, the horizontal coordinate represents the frequency, the vertical coordinate represents the ratio of incident power to reflected power, the smaller the vertical coordinate value is indicates the smaller the reflection energy at the frequency is, the first antenna 11 comprises a first mode corresponding to a resonant frequency of 0.9 GHz and a second mode corresponding to a resonant frequency of 1.7 GHz-1.9 GHz, that is, herein the first antenna 11 has an operating frequency of 0.9 GHz and an operating frequency of 1.7 GHz-1.9 GHz.

Typically, the operating frequencies of the antenna device 10 need to satisfy a certain bandwidth requirement, for example, at present, a low frequency bandwidth of the popular communication protocol LTE (Long Term Evolution, 4G long term evolution) of an antenna device of a mobile terminal is required to cover 260 MHz. In order to satisfy the bandwidth requirement of the antenna device 10, continuously referring to FIG. 3, the first antenna 11 further comprises a first adjustable capacitor 115, in the embodiment, the first adjustable capacitor 115 is provided between the metal piece 102 and the first printed circuit board 113 in the range of the first cavity 111. In other embodiments, the first adjustable capacitor 115 is provided between the metal shell 101 and the first printed circuit board 113 in the range of the first cavity 111, or is provided between the metal shell 101 and the metal piece 102 in the range of the first cavity 111.

Figure 6:
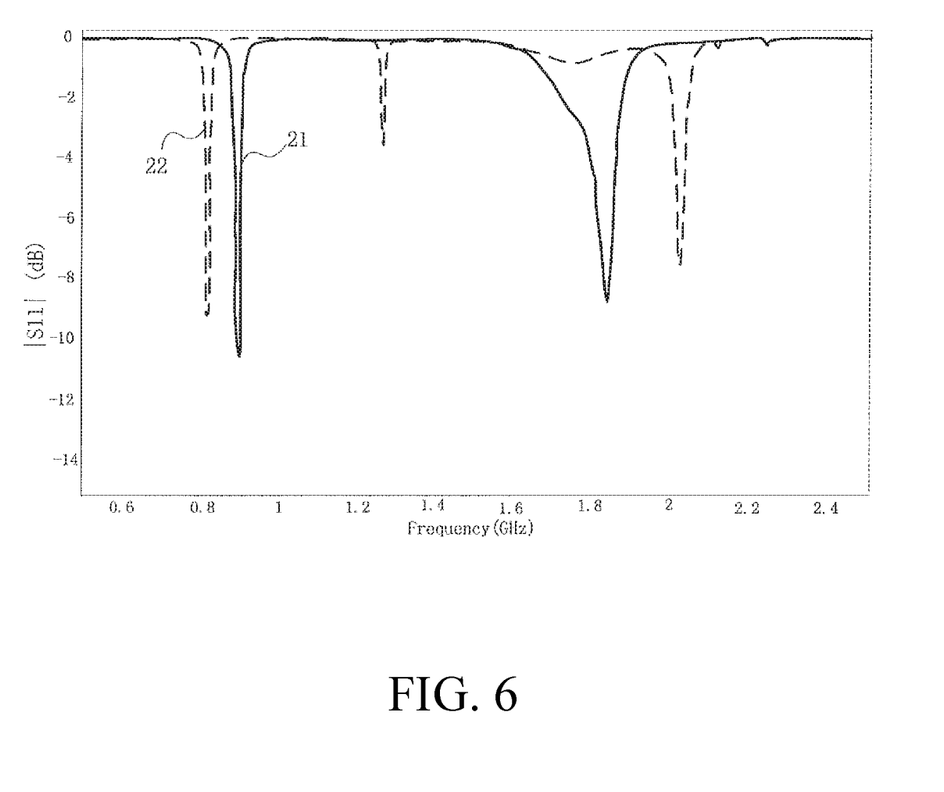
FIG. 6 is a frequency-return loss diagram of in the first embodiment of the present disclosure with different capacitances added to the first antenna through an adjustable capacitor.

In the embodiment, a range of a capacitance of the first adjustable capacitor 115 is 1-5 pF. FIG. 6 is a frequency-return loss diagram of in the first embodiment of the present disclosure with different capacitances added to the first antenna through an adjustable capacitor. As shown in FIG. 6, the first capacitance frequency-return loss curve 21 shows the return loss curve of the first antenna 11 as the capacitance of the first adjustable capacitor 115 is 1 pF, the second capacitance frequency-return loss curve 22 shows the return loss curve of the first antenna 11 as the capacitance of the first adjustable capacitor 115 is 5 pF, therefore, when the range of the capacitance of the first adjustable capacitor 105 is 1-5 pF, the first antenna 11 comprises a first mode corresponding to the operating frequency of 800 MHz-960 MHz and a second mode corresponding to the operating frequency of 1.8 GHz-2.2 GHz, so that the operating frequencies of the first cavity 111 satisfy the bandwidth requirement through the first adjustable capacitor 115.

Hereinafter the structure of the second antenna 12 is described.

As shown in FIG. 2 and FIG. 4, the second antenna 12 is coupling-fed by the second feed unit 122. Coupling feed means that the second feed unit 122 feeds toward the second cavity 121 without contacting the second cavity 121.

The second antenna 12 comprises a second printed circuit board 123. The second feed unit 122 is electrically connected with the second printed circuit board 123 and obtains an excitation current from the second printed circuit board 123. The second feed unit 122 comprises a third ribbon wire 1221, a fourth ribbon wire 1222 and a fifth ribbon wire 1223 which are connected, the third ribbon wire 1221, the fourth ribbon wire 1222 and the fifth ribbon wire 1223 form a U-shape. The second feed unit 122 coupling-feeds toward the second cavity 121. The second feed unit 122 is provided at one side of the second printed circuit board 123 far from the metal isolate wall 106 such that the second feed unit 122 has a better excitation effect on the second cavity 121.

The second antenna 12 further comprises a spurious unit 124, the spurious unit 124 comprises a first ribbon wire 1241 and a second ribbon wire 1242 which are connected to form a L-shape, the first ribbon wire 1241 is provided parallel to and between the third ribbon wire 1221 and the fifth ribbon wire 1223. The second ribbon wire 1242 is provided perpendicular to a plane where the first ribbon wire 1241 is located, the second ribbon wire 1242 is connected with the metal shell 101.

The spurious unit 124 is coupling-fed by the second feed unit 122. Operating bands of the spurious unit 124 partially overlap frequencies corresponding to modes formed by the second cavity 121 to supplement the second cavity 121. In the embodiment, the first ribbon wire 1241 is provided between the third ribbon wire 1221 and the fifth ribbon wire 1223, so as to save design space. In other embodiments, the first ribbon wire 1241 may also be provided at other positions.

Figure 7:
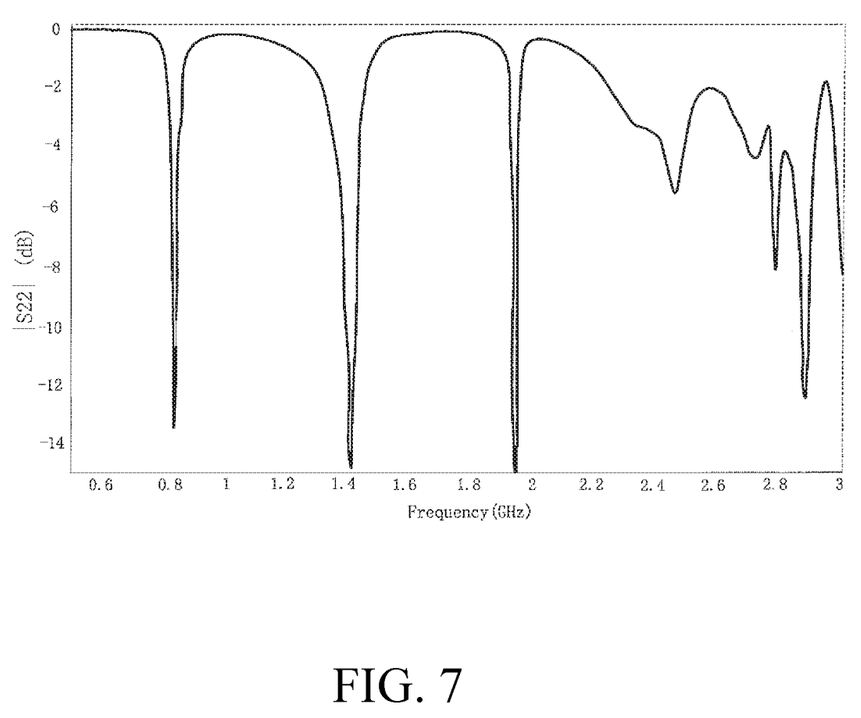
FIG. 7 is a frequency-return loss diagram of the second antenna in the first embodiment of the present disclosure.

FIG. 7 is a frequency-return loss diagram of the second antenna in the first embodiment of the present disclosure. As shown in FIG. 7, the horizontal coordinate represents the frequency, the vertical coordinate represents the ratio of incident power to reflected power, the smaller the vertical coordinate value is indicates the smaller the reflection energy at the frequency is, the second antenna 12 comprises a first mode corresponding to the resonant frequency of 0.8 GHz and a second mode corresponding to the resonant frequency of 1.9 GHz, that is, herein the second antenna 12 has the operating frequency of 0.8 GHz and the operating frequency of 1.9 GHz.

The second antenna 12 further comprises a second adjustable capacitor 125 similar to the first adjustable capacitor 115 in the first antenna 11, the second adjustable capacitor 125 electrically connects the metal piece 102 and the second printed circuit board 123 in the range of the second cavity 121, so that the operating frequencies of the second cavity 121 satisfy the bandwidth requirement. In other embodiments, the second adjustable capacitor 125 is provided between the metal shell 101 and the second printed circuit board 123 in the range the second cavity 121, or is provided between the metal shell 101 and the metal piece 102 in the range of the second cavity 121.

Figure 8:
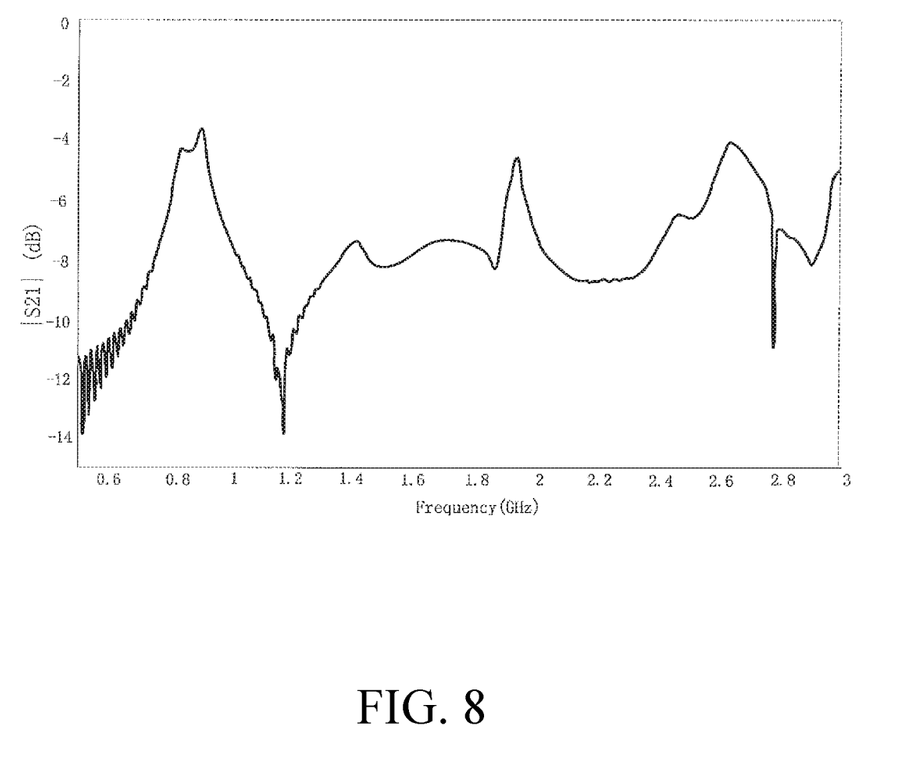
FIG. 8 is a transfer characteristic curve of the antenna device in the first embodiment of the present disclosure.

FIG. 8 is a transfer characteristic curve of the antenna device in the first embodiment of the present disclosure. As shown in FIG. 8, the horizontal coordinate represents the frequency, the vertical coordinate represents the isolation of the antenna device, the smaller the vertical coordinate value is indicates the higher the isolation between the first antenna 11 and the second antenna 12 is, that is, less interference is. When the first antenna 11 and the second antenna 12 operate simultaneously, isolations are lower than −23 dB, thereby indicating that the first antenna 11 and the second antenna 12 respectively comprising the first cavity 111 and the second cavity 121 which are partitioned and independent in structure in the present disclosure has better isolation, can operate independently from each other and less interfere with each other.

It can be seen from the above description of the antenna device 10, in the case that the outer shell is a full metal, the antenna device 10 in the embodiment forms a MIMO antenna device with high isolation through the first antenna 11 and the second antenna 12, and can effectively receive and transmit signals at the operating frequencies to achieve the MIMO function.

In the embodiment, the first antenna 11 directly feeds via the first feed unit 112, and in other embodiments, the first feed unit 112 coupling-feeds toward the first antenna 11, when the first feed unit 112 coupling-feeds toward the first antenna 11, the specific structure of the first feed unit 112, for example, may be the structure of the second feed unit 122 in the embodiment. Similarly, the second feed unit 122 coupling-feeds via the second antenna 12, and in other embodiments, the second feed unit 122 directly feeds toward the second antenna 12, when the second feed unit 122 directly feeds toward the second antenna 12, the specific structure of the second feed unit 122, for example, may be the structure of the first feed unit 112 in the embodiment.

The radiation unit 114 serving as a supplement for the operating band of the first cavity 111 is provided in the first antenna 11, and in other embodiments, the radiation unit 114 may be provided in the second antenna 12.

The spurious unit 124 serving as a supplement for the operating band of the second cavity 121 is provided in the second antenna 12, and in other embodiments, the spurious unit 124 may be provided in the first antenna 11.

Figure 9:
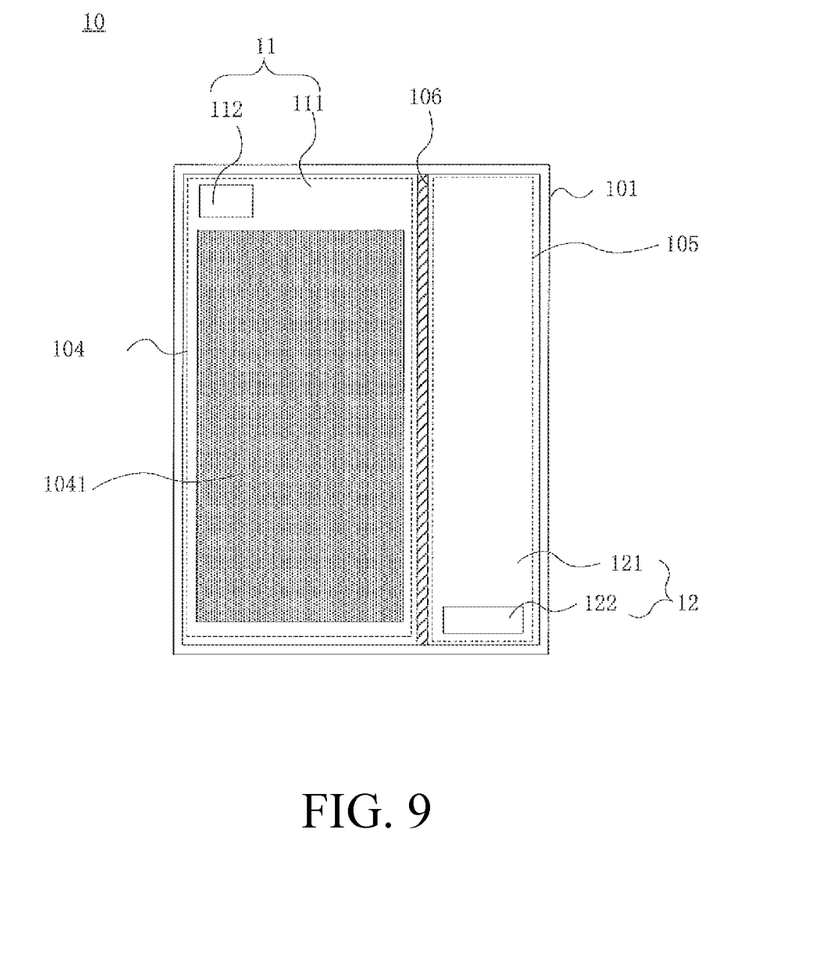
FIG. 9 is a top view of the antenna device in the second embodiment of the present disclosure with a metal piece removed.

FIG. 9 is a top view of the antenna device in the second embodiment of the present disclosure with a metal piece removed. As shown in FIG. 9, the difference between the second embodiment and the first embodiment lies in that, in the second embodiment, the battery region 104 and the non-battery region 105 are arranged in a width direction. The extending direction of the metal isolate wall 106 is parallel to the length direction of the metal cavity 103 to match with the structures of the battery region 104 and the non-battery region 105. The metal isolate wall 106 is provided at a boundary between the battery region 104 and the non-battery region 105 to reduce the effect of the battery assembly 1041 on a signal of the antenna device 10.

Similar to the structure of the first embodiment, the first feed unit 112 directly feeds or coupling-feeds toward the first cavity 111 to form the first antenna 11, the second feed unit 122 directly feeds or coupling-feeds toward the second cavity 121 to form the second antenna 12. The first feed unit 112 and the second feed unit 122 may be respectively provided at opposite ends the metal shell 101 in the length direction as shown in FIG. 9, and may also be provided at the same end of the metal shell 101 in the length direction in other embodiments.

Other structures of the antenna device 10 in the second embodiment may refer to the structure of the antenna device 10 of the first embodiment, and the details are not described herein again.

Figure 10:
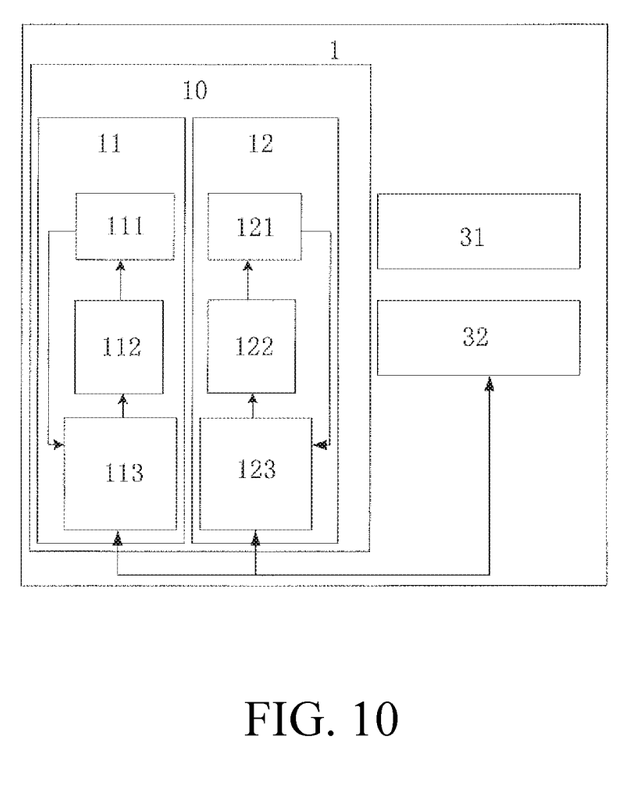
FIG. 10 is a module diagram of a mobile communication device.

FIG. 10 is a module diagram of a mobile communication device, as shown in FIG. 10, the mobile communication device 1 comprises an antenna device 10, a display device 31 and a signal transceiver 32.

The antenna device 10 is a MIMO antenna, is used to transmit or receive communication signals, and comprises a first antenna 11 and a second antenna 12. A rear shell of the mobile communication device 1, that is, the metal shell 101 of the antenna device 10, comprises a metal back plate 1011 and a metal frame 1012 which are integrally formed. The specific structure of the antenna device 10 is as described above, and the details are not described herein again.

The first antenna 11 comprises a first cavity 111, a first feed unit 112 and a first printed circuit board 113, the first feed unit 112 is electrically connected with the first printed circuit board 113, the first printed circuit board 113 conveys an excitation current to the first feed unit 112, the first feed unit 112 directly feeds or coupling feeds toward the first cavity 111.

The second antenna 12 comprises a second cavity 121, a second feed unit 122 and a second printed circuit board 123, the second feed unit 122 is electrically connected with the second printed circuit board 123, the second printed circuit board 123 conveys an excitation current to the second feed unit 122, the second feed unit 122 directly feeds or coupling-feeds toward the second cavity 121.

The first antenna 11 and the second antenna 12 operate independently respectively, and do not interfere with each other, so as to form a reliable operating MIMO antenna device. In the embodiment, the first antenna 11 serves as a main antenna, the second antenna 12 serves as a diversity antenna. In other embodiments, the second antenna 12 serves as the main antenna, the first antenna 11 serves as the diversity antenna.

The signal transceiver 32 is electrically connected with the first printed circuit board 113 and the second printed circuit board 123, when the mobile communication device 1 is required to transmit signals, the signal transceiver 32 outputs power, and makes the first feed unit 112 and the second feed unit 122 respectively feed toward the first antenna 11 and the second antenna 12 by the first printed circuit board 113 and the second printed circuit board 123. When the first antenna 11 or the second antenna 12 of the antenna device 10 receives the signals, the signal transceiver 32 receives the signals received by the antenna device 10.

The display device 31 is provided to one side of the metal piece 102 of the antenna device 10 opposite to the metal back plate 1011. The metal piece 102 may also serve as a shielding piece of the display device 31 for shielding an interfering electromagnetic field of the display device 31.

The mobile communication device 1 generally further comprises other modules or components, for example, a processor, audio input and output module and the like, other modules or components may use components of the mobile communication devices in the prior art, and the details are not described herein again.

In conclusion, the outer shell of the antenna device 10 or the mobile communication device 1 without adding a non-metal part truly achieves receiving and transmitting signals without interference and metallizing the outer shell completely, and on the basis of this, the first antenna 11 which comprises the first cavity 111 and operates independently and the second antenna 12 which comprises the second cavity 121 and operates independently together form a MIMO antenna device with high isolation, thereby achieving the MIMO function.

The battery region 104 and the non-battery region 105 are distinguished from each other in the metal cavity 103, the battery region 104 is contained in the first antenna 11, so that the effect of the battery assembly 1041 on the signal of the second antenna 12 is reduced, and the battery assembly 1041 serves as a controllable affecting factor to reduce the difficulty of the first antenna design and facilitate debug.

The above are only specific application examples of the present disclosure, which is not intended to limit the scope of the present disclosure. In addition to the above embodiments, the present disclosure may have other embodiments. All technical solutions formed by equivalent substitution or equivalent transformation fall within the scope of the present disclosure. The technical features in the different embodiments exemplified in the present disclosure may also be arbitrarily combined.

The invention claimed is:

1. A MIMO antenna device, comprising:
   a metal shell, the metal shell comprising a metal back plate and a metal frame which are integrally formed, the metal frame surrounding the metal back plate;
   a metal piece, the metal piece and the metal shell enclosing to form a metal cavity, the metal cavity comprising a battery region used to place a battery assembly and a non-battery region outside the battery region;
   a metal isolate wall, the metal isolate wall being provided between the metal shell and the metal piece, the metal isolate wall partitioning the metal cavity into a first cavity and a second cavity, the first cavity containing the battery region;
   a first feed unit, the first feed unit feeding toward the first cavity to form a first antenna; and
   a second feed unit, the second feed unit feeding toward the second cavity to form a second antenna.

2. The MIMO antenna device of claim 1, wherein a gap which is communicated is formed between a periphery of the metal piece and the metal frame.

3. The MIMO antenna device of claim 2, wherein the metal isolate wall is provided in the non-battery region.

4. The MIMO antenna device of claim 3, wherein the metal isolate wall is provided at a boundary between the battery region and the non-battery region.

5. The MIMO antenna device of claim 1, wherein the metal cavity is a rectangular shape,
   an extending direction of the metal isolate wall is parallel to a length direction or a width direction of the metal cavity.

6. The MIMO antenna device of claim 5, wherein the metal isolate wall extends to connect two opposite side surfaces of the metal frame.

7. The MIMO antenna device of claim 6, wherein the metal isolate wall and the metal shell are integrally formed.

8. The MIMO antenna device of claim 6, wherein the metal isolate wall and the metal piece are integrally formed.

9. The MIMO antenna device of claim 1, wherein the metal isolate wall and the metal shell are integrally formed.

10. The MIMO antenna device of claim 1, wherein the metal isolate wall and the metal piece are integrally formed.

11. The MIMO antenna device of claim 1, wherein
    the first antenna or the second antenna further comprises a radiation unit and a first printed circuit board, the radiation unit comprises a first slot and a second slot which are provided on the first printed circuit board and connected, a sum of lengths of the first slot and the second slot is equal to one fourth of a wavelength of an operating band of the first antenna or the second antenna.

12. The MIMO antenna device of claim 11, further comprising an adjustable capacitor, the adjustable capacitor electrically connecting the first printed circuit board and the metal shell, or electrically connecting the first printed circuit board and the metal piece.

13. The MIMO antenna device of claim 11, wherein the first slot and the second slot form a L-shape.

14. The MIMO antenna device of claim 1, wherein
    the first antenna further comprises a second printed circuit board and a spurious unit, the spurious unit comprises a first ribbon wire and a second ribbon wire which are connected to form a L-shape;
    the first feed unit is electrically connected with the second printed circuit board, the first feed unit comprises a third ribbon wire, a fourth ribbon wire and a fifth ribbon wire which are connected, the third ribbon wire, the fourth ribbon wire and the fifth ribbon wire form a U-shape, the first ribbon wire is provided parallel to and between the third ribbon wire and the fifth ribbon wire;
    the first cavity is coupling-fed by the first feed unit, the spurious unit is coupling-fed by the first feed unit.

15. The MIMO antenna device of claim 14, further comprising an adjustable capacitor, the adjustable capacitor electrically connecting the second printed circuit board and the metal shell, or electrically connecting the second printed circuit board and the metal piece.

16. The MIMO antenna device of claim 1, wherein,
    the second antenna further comprises a second printed circuit board and a spurious unit, the spurious unit comprises a first ribbon wire and a second ribbon wire which are connected to form a L-shape;
    the second feed unit is electrically connected with the second printed circuit board, the second feed unit comprises a third ribbon wire, a fourth ribbon wire and a fifth ribbon wire which are connected, the third ribbon wire, the fourth ribbon wire and the fifth ribbon wire form a U-shape, the first ribbon wire is provided parallel to and between the third ribbon wire and the fifth ribbon wire;

the second cavity is coupling-fed by the second feed unit, the spurious unit is coupling-fed by the second feed unit.

17. The MIMO antenna device of claim 16, further comprising an adjustable capacitor, the adjustable capacitor electrically connecting the second printed circuit board and the metal shell, or electrically connecting the second printed circuit board and the metal piece.

18. The MIMO antenna device of claim 1, further comprising an adjustable capacitor, the adjustable capacitor electrically connecting the metal shell and the metal piece.

19. A mobile communication device comprising the MIMO antenna device of claim 1.

20. The mobile communication device of claim 19, further comprising a display device, the display device being provided to one side of the metal piece opposite to the metal back plate.

21. The mobile communication device of claim 19, further comprising:

a signal transceiver, the signal transceiver being electrically connected with the circuit board, the signal transceiver being used to output power such that the feed units feed toward the antenna device and receives signals received by the antenna device.

* * * * *